US006705683B2

(12) United States Patent
Niepelt et al.

(10) Patent No.: US 6,705,683 B2
(45) Date of Patent: Mar. 16, 2004

(54) METHOD FOR MONITORING THE EMERGENCY BRAKING CAPABILITY OF AN ELECTROHYDRAULIC BRAKING SYSTEM

(75) Inventors: Mathias Niepelt, Friedberg (DE); Georg Fachinger, Limburg (DE); Andreas Klein, Bad Homburg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/240,026

(22) PCT Filed: Mar. 10, 2001

(86) PCT No.: PCT/EP01/02687

§ 371 (c)(1),
(2), (4) Date: Sep. 27, 2002

(87) PCT Pub. No.: WO01/72568

PCT Pub. Date: Oct. 4, 2001

(65) Prior Publication Data

US 2003/0038538 A1 Feb. 27, 2003

(30) Foreign Application Priority Data

Mar. 27, 2000 (DE) .......................................... 100 15 238
Dec. 4, 2000 (DE) .......................................... 100 60 225

(51) Int. Cl.$^7$ .................................................. B60T 8/88
(52) U.S. Cl. ..................... 303/122.13; 303/11; 303/9
(58) Field of Search ........................... 303/3, 9, 10, 11, 303/122.03, 122.08, 122.09, 122.12, 122.13, 155, 115.1, DIG. 11, 85, 80

(56) References Cited

U.S. PATENT DOCUMENTS

| 4,799,048 A | * | 1/1989 | Goshima et al. | ............. | 340/626 |
| 5,221,125 A | * | 6/1993 | Okochi et al. | ................. | 303/10 |
| 5,388,894 A | * | 2/1995 | Holland et al. | ............... | 303/10 |

(List continued on next page.)

FOREIGN PATENT DOCUMENTS

| DE | 196 03 909 |   | 8/1997 |
| EP | 1004494 |   | 5/2000 |
| GB | 2317663 |   | 4/1998 |
| JP | 867244 | * | 3/1996 |
| JP | 11348759 | * | 12/1999 |
| JP | 2002200977 | * | 7/2002 |

Primary Examiner—Christopher P. Schwartz
Assistant Examiner—Devon Kramer
(74) Attorney, Agent, or Firm—Rader, Fishman & Grauer PLLC

(57) ABSTRACT

To monitor the emergency braking capability of an electrohydraulic braking system (EHBwherein, during normal operation, the brake pressure in the wheel brakes is generated by means of a pressure source comprised of a hydraulic pump, an umulator, and hydraulic valves, and wherein a switch-over to a hydraulic connection between a master cylinder and the wheel brakes is executed in the event of an emergency braking situation. With predetermined events, e.g. during each initialization of the brake system, the emergency braking capability is checked using the following steps:

a) charging of the accumulator, without brake pressure buildup in the wheel brakes; measuring the accumulator pressure, or the accumulator volume or the filling level of the accumulator;

b) pressure introduction into the wheel brakes until a predetermined pressure threshold is reached, with the hydraulic pump deactivated or hydraulically uncoupled;

c) measuring the accumulator pressure;

d) determining and evaluating the accumulator performance in response to the pressure introduction into the wheel brakes for finding out the current volume requirement and/or the condition of the brake fluid, detecting air inclusions, etc., and for judging the current emergency braking capability of the brake system.

6 Claims, 1 Drawing Sheet

U.S. PATENT DOCUMENTS

| | | | |
|---|---|---|---|
| 5,979,999 A | | 11/1999 | Poertzgen et al. |
| 6,132,012 A | * | 10/2000 | Ishii ...................... 303/122.12 |
| 6,189,982 B1 | * | 2/2001 | Harris et al. ............. 303/116.1 |
| 6,318,817 B1 | * | 11/2001 | Martin et al. ............ 303/116.1 |
| 6,341,947 B1 | * | 1/2002 | Otomo ....................... 417/286 |
| 6,357,835 B1 | * | 3/2002 | Boisseau ................. 303/113.5 |
| 2001/0045772 A1 | * | 11/2001 | Schmidt et al. .......... 303/113.1 |
| 2002/0030404 A1 | * | 3/2002 | Nitta et al. ............ 303/122.12 |
| 2002/0093243 A1 | * | 7/2002 | Nitta et al. .................... 303/11 |

* cited by examiner

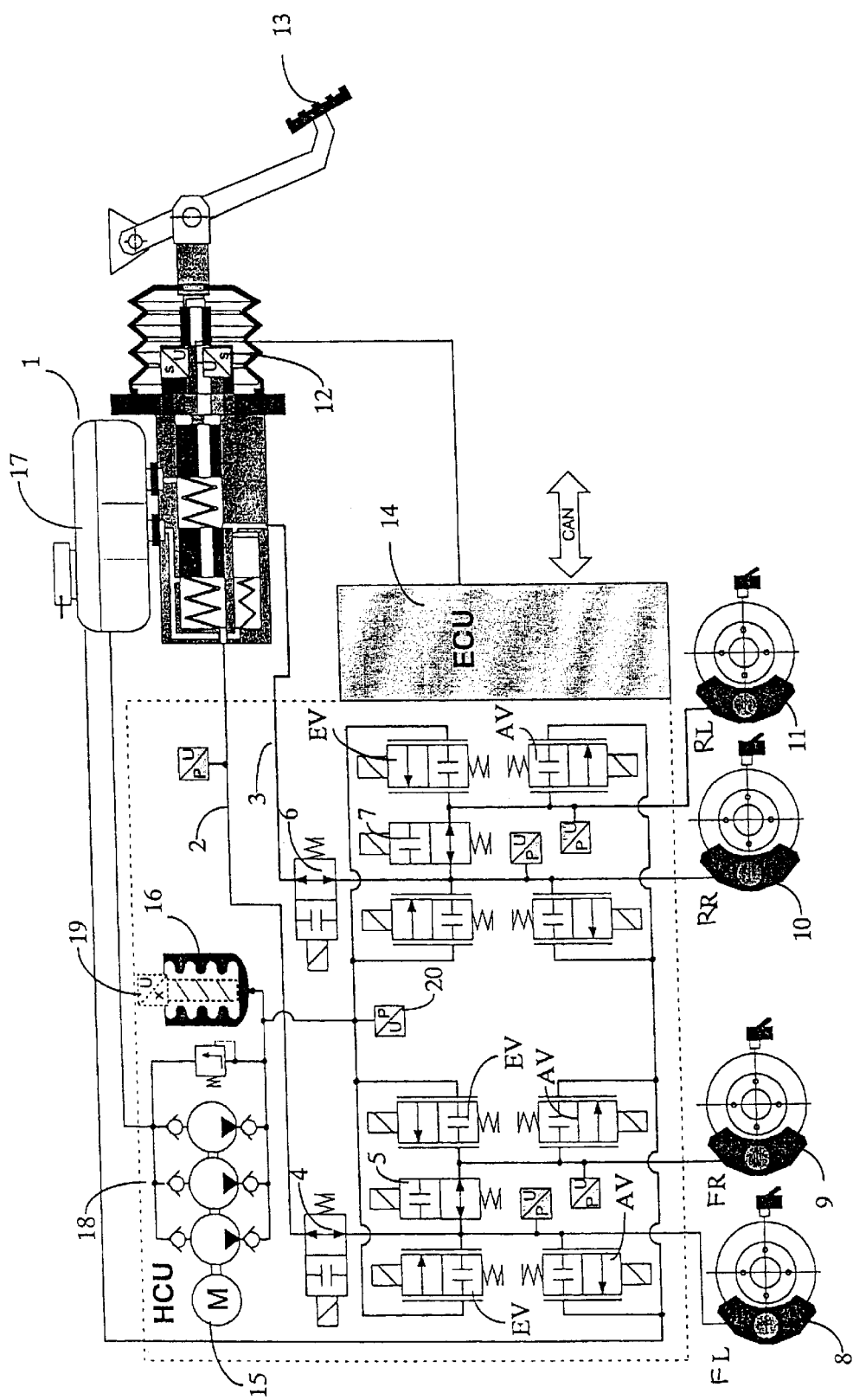

METHOD FOR MONITORING THE EMERGENCY BRAKING CAPABILITY OF AN ELECTROHYDRAULIC BRAKING SYSTEM

TECHNICAL FIELD

The present invention relates to a method for monitoring the function and emergency braking capability of an electro-hydraulic braking system (EHB) comprised of a pedal-operated master cylinder and a pressure source with a hydraulic pump, with an accumulator, and with electrically controllable hydraulic valves, wherein the brake pressure in the wheel brakes is supplied from the pressure source in normal operation, and wherein a switch-over to a hydraulic connection between the master cylinder and the wheel brakes is executed in the event of an emergency braking mode.

BACKGROUND OF THE INVENTION

There is a growing interest in electro-hydraulic brake systems (EHB) wherein the driver's braking demand that is expressed by applying the brake pedal during normal operation is converted into an electrical actuating signal used to adjust and control the brake pressure in the individual wheel brakes by means of an electrically controllable hydraulic unit. This hydraulic device comprises one or more electrically driven hydraulic pumps, accumulators, and electrically controllable hydraulic valves that are used to proportion the wheel brake pressure for each individual wheel. Besides, the hydraulic unit comprises sensors for measurement and feedback of the hydraulic pressure that prevails at different locations in the system, among others, in the wheel brakes, at the outlet of the accumulator, etc.

Brake systems of this type provide an emergency braking capability even if the electronic unit and the pressure source fail. To reach this aim, the brake pedal acts upon a master cylinder which, in an emergency braking mode, instead of the pressure source, is connected directly to the wheel brakes by way of normally open hydraulic valves, i.e., open in their de-energized inactive position. In principle, there is no difference in the emergency braking mode compared to a conventional uncontrolled hydraulic brake system.

The result of the hydraulic uncoupling of the brake pedal from the wheel brakes during normal operation is that also the reactive effect of the braking action to the brake pedal is interrupted. While in conventional hydraulic brake systems the driver, when applying the brake pedal, monitors the operability of the brake system by observing the performance of pedal travel, pedal force, and vehicle deceleration, and thereby detects any leakage, an excessive clearance, or the inclusion of air in the hydraulic fluid or in the brakes by a change in the pedal travel or pedal feeling, this is no longer possible in an EHB in consequence of the uncoupling action. Failure of this monitoring function will lead to the circumstance that some defects cannot be recognized at all or not in time. This applies, among others, to the detection of air inclusions in the wheel brakes necessitating an increased pressure fluid requirement during a braking action which, in the normal mode, can be satisfied easily by the pressure source, but which cannot be complied with by the master cylinder in the emergency braking mode. This means, a 'sleeping' defect is caused which will not show until failure of the service brake and return to the fall-back level, the emergency mode.

BRIEF SUMMARY OF THE INVENTION

In view of the above, an object of the present invention is to develop a monitoring method which permits detecting the loss in emergency braking capability, e.g. as a result of air inclusions in the wheel brakes, even if the brake system is intact.

It has been found that this object can be achieved by monitoring the function and emergency braking capability of an electro-hydraulic braking system (EHB) comprised of a pedal-operated master cylinder and a pressure source with a hydraulic pump, with an accumulator, and with electrically controllable hydraulic valves, wherein the brake pressure in the wheel brakes is supplied from the pressure source in normal operation, and wherein a switch-over to a hydraulic connection between the master cylinder and the wheel brakes is executed in the event of an emergency braking mode, wherein [the method [described in claim 1, the special characteristics of which includes that with predetermined events, e.g. during initialization of the brake system,] the emergency braking capability is checked by means of the following steps:

a) charging of the accumulator, without brake pressure buildup in the wheel brakes; measuring the accumulator pressure, and/or the accumulator volume or the filling level of the accumulator;

b) pressure introduction into the wheel brakes until a predetermined pressure threshold is reached, with the hydraulic pump deactivated or hydraulically uncoupled;

c) measuring the accumulator pressure;

d) determining and evaluating the accumulator performance in response to the pressure introduction into the wheel brakes for finding out the current volume requirement and/or the condition of the brake fluid, detecting air inclusions, etc., and for judging the current emergency braking capability of the brake system.

Thus, the present invention is based on the reflection that 'sleeping' defects of the type described above can be detected by testing the braking system in a simple and reliable manner using the method of the present invention during initialization of the brake system, that is, with each start of the vehicle.

BRIEF DESCRIPTION OF THE DRAWING

The attached drawing is showing an embodiment of the basic components and of the hydraulic circuit configuration of an electro-hydraulic braking system (EHB) monitored by of the method according to of the present invention.

DETAILED DESCRIPTION OF THE PREFERRED EMBODIMENTS

Further details, advantages, and possible applications of the present invention can be taken from the following description with reference to the attached drawing.

The brake system illustrated is comprised of a pedal-operated tandem master cylinder 1. Two wheel brakes FL, FR; RR, RL are respectively connected to the hydraulic brakes circuits 2, 3 of cylinder 1 in a customary fashion. The intermediately connected hydraulic valves 4, 5; 6, 7 are open in their inactive position, as shown. Reference numerals 4, 6 designate so-called separating valves. Valves 5, 7 are used for pressure compensation in the normal operation.

After activation of the separating valves 4, 6 of the brake system shown, the hydraulic conduits 2, 3 that lead from the tandem master cylinder 1 to the wheel brakes are interrupted so that the braking action or the brake pressure variation in the wheel brakes 8 to 11 is exclusively determined by electrical signals which are produced by means of a travel sensor 12 in dependence on the application of brake pedal 13. This is represented in the drawing by a circuit or ECU 14. ECU 14 receives and processes different types of input signals. Only the signal conduit from the pedal travel sensor 12 to the ECU 14 and a data bus CAN are shown, through which all other signals (wheel sensor signals, pressure sensor signals, valve control signals, etc.) are input and relayed.

The brake system comprises a pressure fluid accumulator 16, a pleated-bellows accumulator in this example, which is equipped with a travel sensor 19 for determining the filling level of the accumulator in the embodiment shown. A pressure sensor 20 is connected to the output of the accumulator 16 to measure the hydraulic pressure.

It can be easily seen from the hydraulic circuit depicted that a corresponding change-over of the illustrated hydraulic valves causes brake pressure to propagate from the pressure source, which basically includes an accumulator 19, a pump, e.g. a three-piston pump 18 driven by an electric motor (15), and some valves, to the wheel brakes 8 to 11, and pressure proportioning is controlled by a corresponding actuation of the inlet valves EV. Outlet valves AV are provided for reducing the brake pressure, with the output of the valves leading in a known fashion to a pressure compensating reservoir 17 which, in turn, is connected to the suction side of the hydraulic pump 18.

To monitor the function and emergency braking capability of the illustrated electro-hydraulic brake system (EHB), the method of the present invention is executed in several steps, e.g. in connection with each ignition of the vehicle engine. To this end, the accumulator 16 is charged as a first action after the initialization of the vehicle or the brake system, with the pressure fluid conduit to the wheel brakes 8 to 11 being still closed for the time being. The separating valves 4, 6 are also actuated and closed thereby.

In an optional intermediate step which especially aims at detecting air inclusions in the wheel brakes, as a next action, the wheel brakes can be preloaded by introducing a low pressure of roughly 1 bar in order to apply the brake discs and overcome the clearance. The conduction of pressure fluid from the accumulator 16 into the wheel brakes 8 to 11 or only into the wheel brakes of one circuit that is necessary for this action is sensed by subsequently measuring the accumulator pressure or the filling quantity by means of sensors 20 or 19.

In a next step, pressure fluid is introduced through the inlet valves EV until the brake pressure rises in the wheel brakes to e.g. 5 bar. Thereafter, the accumulator pressure or the filling quantity of the accumulator 16 is measured again so that now all test values are available to produce a mathematic model of the accumulator performance or the reaction to the conduction of pressure fluid from the accumulator 16 to the wheel brakes. The quantity or the volume of the pressure fluid conducted from the accumulator 16 into the wheel brakes 8 to 11 in the test steps according to the present invention must be below a predetermined maximum value in order to ensure the emergency braking capability of the brake system.

When the volume conducted into the wheel brakes 8 to 11 in the above-mentioned steps is below a predetermined maximum value, it is ensured that pressure fluid can be conducted in a sufficient quantity from the tandem master cylinder 1 into the wheel brakes 8 to 11 even in a case of emergency, that means, with the current supply disconnected, when a direct connection between the master cylinder 1 and the wheel brakes 8 to 11 is established by way of the opened separating valves 4, 5 and the valves 5, 7. The emergency braking capability of the brake system is ensured as long as the maximum value is not reached or exceeded in this test operation.

What is claimed is:

1. Method for monitoring an emergency braking capability of an electro-hydraulic braking system of the type including
a pedal-operated master cylinder and a pressure source with a hydraulic pump, an accumulator, electrically controllable hydraulic valves, wherein the brake pressure in the wheel brakes is supplied from the pressure source in normal operation, and wherein a switch-over to a hydraulic connection between the master cylinder and the wheel brakes is executed in the event of an emergency braking mode, comprising the steps of:
   a) charging the accumulator, without brake pressure buildup in the wheel brakes; measuring the accumulator pressure, or the accumulator volume, or the filling level of the accumulator;
   b) pressurizing the wheel brakes until a predetermined pressure threshold is reached, with the hydraulic pump deactivated or hydraulically uncoupled;
   c) measuring the accumulator pressure;
   d) determining and evaluating the accumulator performance in response to the pressure introduction into the wheel brakes.

2. Method as claimed in claim 1, further including the step of checking the emergency braking capability during each initialization of the brake system.

3. Method as claimed in claim 1, further including the step of checking the wheel brakes by introducing a brake pressure of the magnitude of 1 to 2 bar in order to overcome a clearance with a subsequent measurement of the accumulator pressure.

4. Method as claimed in claim 1, further including the step of evaluating the emergency braking capability by inferring a volume output by the accumulator from test values of the accumulator pressure before and after the introduction of brake pressure into the wheel brakes by way of a mathematic model of the accumulator performance, and wherein the volume output by the accumulator is evaluated to determine the current emergency braking capability of the brake system.

5. Method as claimed in claim 4, wherein the volume output by the accumulator is compared with a predetermined maximum value and used to determine the current emergency braking capability of the brake system or the condition of the hydraulic fluid.

6. Method as claimed in claim 4, wherein volume output by the accumulator or the filling level of the accumulator is determined by means of a travel sensor arranged at the accumulator.

* * * * *

UNITED STATES PATENT AND TRADEMARK OFFICE
CERTIFICATE OF CORRECTION

PATENT NO. : 6,705,683 B2
DATED : March 16, 2004
INVENTOR(S) : Mathias Niepelt et al.

It is certified that error appears in the above-identified patent and that said Letters Patent is hereby corrected as shown below:

<u>Title page,</u>
Item [57], ABSTRACT,
Line 2, please change "EHBwherein" to -- EHB wherein --.
Line 5, please change "an umulator" to -- an accumulator --.

Signed and Sealed this

Eighth Day of June, 2004

JON W. DUDAS
*Acting Director of the United States Patent and Trademark Office*